US009482763B2

(12) United States Patent
Vasilyev et al.

(10) Patent No.: US 9,482,763 B2
(45) Date of Patent: Nov. 1, 2016

(54) NEUTRON AND GAMMA SENSITIVE FIBER SCINTILLATORS

(71) Applicant: Baker Hughes Incorporated, Houston, TX (US)

(72) Inventors: Maxim Vasilyev, The Woodlands, TX (US); Toyli Anniyev, The Woodlands, TX (US); Valery N. Khabashesku, Houston, TX (US); Andrey Federov, Minsk (BY); Mikhail Korjik, Minsk (BY); Gregor Chubaryan, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/273,418

(22) Filed: May 8, 2014

(65) Prior Publication Data

US 2015/0323683 A1  Nov. 12, 2015

(51) Int. Cl.
*G01V 5/12* (2006.01)
*G01T 3/06* (2006.01)
(Continued)

(52) U.S. Cl.
CPC ............. *G01T 3/06* (2013.01); *G01T 1/201* (2013.01); *G01V 5/107* (2013.01); *G01V 5/125* (2013.01); *G01V 5/101* (2013.01)

(58) Field of Classification Search
CPC .............................. G01V 5/101; G01V 5/125
See application file for complete search history.

(56) References Cited

U.S. PATENT DOCUMENTS 4,795,910 A * 1/1989 Henderson et al. ....... 250/483.1
5,264,702 A * 11/1993 Mihalczo ................. 250/390.11
5,281,820 A * 1/1994 Groh et al. .................... 250/368
(Continued)

FOREIGN PATENT DOCUMENTS

GB       2253070 A  *  8/1992
JP    2010-134753 A    5/1998
(Continued)

OTHER PUBLICATIONS

Koroleva, T.S. et al., "New scintillation materials and scintiblocs for neutron and γ-rays registration," Nuclear Instruments and Methods in Physics Research A 537, pp. 415-423 (2005).
(Continued)

*Primary Examiner* — Christine Sung
(74) *Attorney, Agent, or Firm* — Mossman Kumar & Tyler PC

(57) ABSTRACT

One general embodiment according to the present disclosure may be formation evaluation tool for detecting radiation in a borehole in a volume of an earth formation. The tool may include a detector including a monolithic scintillation element comprising a coherent assemblage of joined fibers, wherein the fibers are made of an optically transparent scintillation media. The fibers may be at least one of i) gamma ray responsive; and ii) neutron responsive. The coherent assemblage of fibers may be a continuous mass, may be heat-joined. The fibers may be solid. The scintillation media may comprise at least one of i) organic crystalline scintillation materials, ii) amorphous glass, and iii) nano-structured glass ceramics. The coherent assemblage of fibers may be asymmetric. The coherent assemblage of fibers may surround a further scintillation media having different scintillation characteristics than the scintillation media. The scintillation element may be azimuthally sensitive.

19 Claims, 7 Drawing Sheets

(51) Int. Cl.
*G01T 1/20* (2006.01)
*G01V 5/10* (2006.01)

(56) References Cited

U.S. PATENT DOCUMENTS

| | | | |
|---|---|---|---|
| 5,308,986 A * | 5/1994 | Walker | G01T 1/201 250/367 |
| 5,793,046 A * | 8/1998 | Jeffers et al. | 250/364 |
| 5,905,263 A * | 5/1999 | Nishizawa et al. | 250/368 |
| 6,078,052 A * | 6/2000 | DiFilippo | 250/367 |
| 6,087,665 A * | 7/2000 | Hoffman et al. | 250/483.1 |
| 6,271,510 B1 * | 8/2001 | Boxen | 250/208.1 |
| 6,384,400 B1 * | 5/2002 | Albagli | G01T 1/201 250/208.1 |
| 6,643,538 B1 * | 11/2003 | Majewski et al. | 600/436 |
| 7,233,007 B2 | 6/2007 | Downing et al. | |
| 7,244,947 B2 | 7/2007 | Polichar et al. | |
| 7,288,771 B2 | 10/2007 | Neal et al. | |
| 7,335,891 B2 | 2/2008 | Kniss et al. | |
| 7,508,131 B2 | 3/2009 | Downing et al. | |
| 7,521,686 B2 | 4/2009 | Stuenkel et al. | |
| 7,619,226 B2 | 11/2009 | Beinhocker | |
| 7,863,579 B2 | 1/2011 | Suhami | |
| 7,919,758 B2 | 4/2011 | Stephan et al. | |
| 8,089,048 B2 * | 1/2012 | Schmitt et al. | 250/362 |
| 8,237,129 B2 | 8/2012 | Sullivan et al. | |
| 8,247,781 B2 | 8/2012 | Frank | |
| 8,258,483 B1 | 9/2012 | Boatner et al. | |
| 8,314,399 B2 | 11/2012 | Clothier et al. | |
| 8,384,017 B2 | 2/2013 | Botto | |
| 8,507,872 B2 | 8/2013 | Feller et al. | |
| 8,633,449 B2 | 1/2014 | Menge | |
| 8,803,078 B2 * | 8/2014 | Xu et al. | 250/269.4 |
| 2001/0046274 A1 * | 11/2001 | Craig et al. | 376/154 |
| 2004/0238751 A1 * | 12/2004 | Penn | 250/390.01 |
| 2005/0274895 A1 | 12/2005 | Jiang et al. | |
| 2006/0202125 A1 * | 9/2006 | Suhami | B82Y 20/00 250/368 |
| 2009/0272910 A1 * | 11/2009 | Grynyov et al. | 250/390.11 |
| 2010/0111487 A1 | 5/2010 | Aitken et al. | |
| 2011/0035151 A1 * | 2/2011 | Botto | 702/2 |
| 2011/0079726 A1 | 4/2011 | Kusner et al. | |
| 2011/0266643 A1 | 11/2011 | Engelmann et al. | |
| 2011/0291014 A1 | 12/2011 | Kusner | |
| 2011/0293231 A1 | 12/2011 | Van Bommel et al. | |
| 2011/0309257 A1 | 12/2011 | Menge | |
| 2012/0061580 A1 | 3/2012 | Kline et al. | |
| 2012/0112074 A1 | 5/2012 | Clothier | |
| 2012/0223242 A1 | 9/2012 | Brown et al. | |
| 2012/0267519 A1 | 10/2012 | Nikitin et al. | |
| 2012/0312994 A1 | 12/2012 | Nikitin et al. | |
| 2013/0075600 A1 | 3/2013 | Nikitin et al. | |
| 2013/0075848 A1 | 3/2013 | Nikolic et al. | |
| 2013/0146775 A1 | 6/2013 | Ramsden et al. | |
| 2013/0193329 A1 | 8/2013 | Srivastava et al. | |

FOREIGN PATENT DOCUMENTS

| | | |
|---|---|---|
| WO | 93-09447 A1 | 5/1993 |
| WO | WO 9706451 A1 * | 2/1997 |
| WO | 2013003349 A2 | 1/2013 |
| WO | 2013126876 A1 | 8/2013 |

OTHER PUBLICATIONS

Nakamura, T., et al., "A scintillator-based detector with sub-100-μm spatial resolution comprising a fibre-optic taper with wavelength-shifting fibre readout for time-of-flight neutron imaging," Nuclear Instruments and Methods in Physics Research A 737, pp. 176-183 (2014).

Int'l Search Report and Written Opinion in PCT/US2015/029432, dtd Aug. 27, 2015.

* cited by examiner

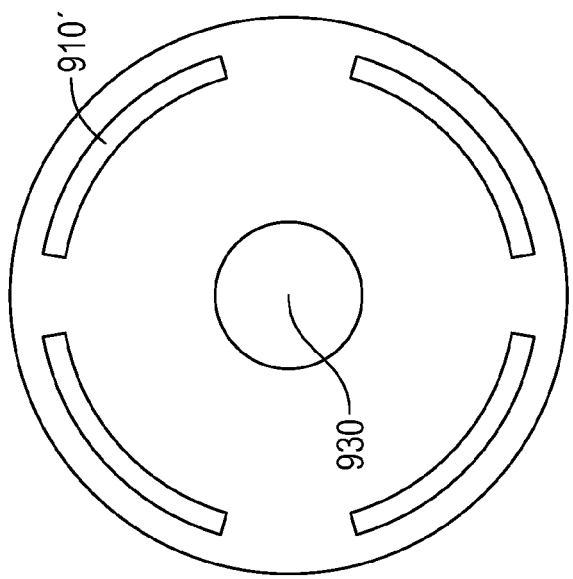
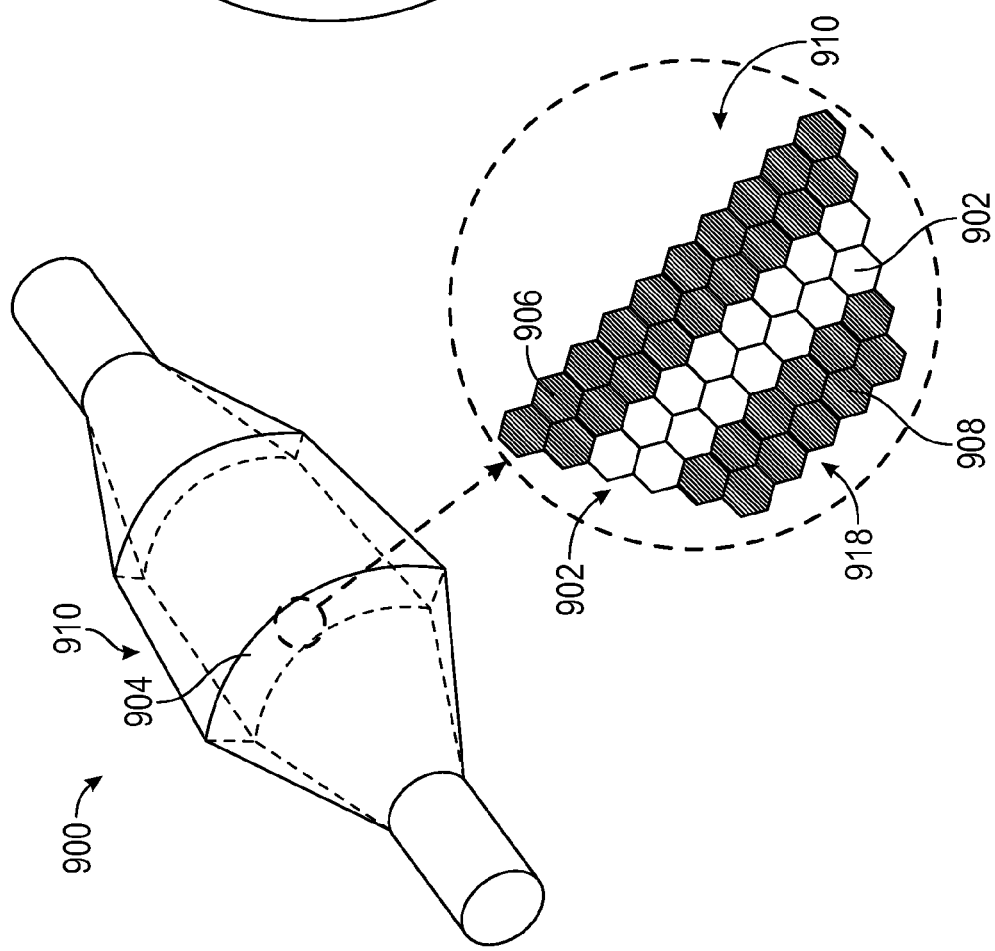

NEUTRON AND GAMMA SENSITIVE FIBER SCINTILLATORS

FIELD OF THE DISCLOSURE

In one aspect, this disclosure generally relates to borehole logging methods and apparatuses for estimating at least one parameter of interest relating to a volume of matter using nuclear radiation based measurements.

BACKGROUND OF THE DISCLOSURE

Oil well logging has been known for many years and provides information about a particular earth formation. In conventional well logging, during well drilling and/or after a well has been drilled, a radiation source and associated radiation detectors may be conveyed into the borehole and used to determine one or more parameters of interest of the formation. A rigid or non-rigid carrier is often used to convey the radiation source, often as part of a tool or set of tools, and the carrier may also provide communication channels for sending information up to the surface. The present disclosure is directed to enhancing the manufacture, use, and effectiveness of such devices.

SUMMARY OF THE DISCLOSURE

In aspects, the present disclosure is related to methods of estimating a parameter of interest of a formation using radiation detected from a subterranean formation.

One general embodiment according to the present disclosure may be formation evaluation tool for detecting radiation in a borehole in a volume of an earth formation. The tool may include a detector including a monolithic scintillation element comprising a coherent assemblage of joined fibers, wherein the fibers are made of an optically transparent scintillation media. The fibers may be at least one of i) gamma ray responsive; and ii) neutron responsive. The scintillation media may comprise at least one of i) DSB:Ce and ii) glass or glass ceramics containing Li6. The coherent assemblage of fibers may be a continuous mass. The coherent assemblage of joined fibers may be heat-joined. The fibers may be solid. The scintillation media may comprise at least one of i) organic crystalline scintillation materials, ii) amorphous glass, and iii) nanostructured glass ceramics. The coherent assemblage of fibers may be asymmetric.

The coherent assemblage of fibers may surround a further scintillation media having different scintillation characteristics than the scintillation media. The tool may include at least one photodetector configured to produce a first output in response to first light scintillations generated by the coherent assemblage of fibers and a second output in response to second light scintillations generated by the further scintillation media; and a processor configured to determine a difference in the amount of the first light scintillations and the second light scintillations from the first output and the second output. The scintillation element may be azimuthally sensitive. The further scintillation media may comprise at least one of i) single crystal material and ii) polycrystalline material. The scintillation detector may be configured to detect gamma rays such that, during nominal operation, the probability of detection of gamma rays in the scintillation media is maximized subject to detection of a threshold number of gamma rays in the further scintillation media.

The coherent assemblage of fibers may surround a further scintillation media having different scintillation characteristics than the scintillation media. The assemblage of fibers may further include a plurality of heavy metal rods interspersed with and substantially parallel to the fibers.

The scintillation element may surround an optical light guide comprising a second coherent assemblage of heat-fused fibers. The fibers may be at least 50 centimeters in length. The coherent assemblage of fibers may be configured to allow light to travel substantially parallel to the longitudinal axis of the fibers. At least a portion of the fibers may be each surrounded by cladding. The coherent assemblage of fibers may comprise an first layer of fibers forming a first radiation responsive component and a second layer of fibers forming an optically transparent light guide. The coherent assemblage of fibers may comprise a third layer of fibers, interior to the first layer and second layer, forming a second radiation responsive component. The first radiation responsive component may be configured to detect neutrons from the earth formation; the second layer of fibers may be made of an optically transparent neutron absorptive material; and the second radiation responsive component may be configured to detect neutrons from the borehole. The tool may further include a drill string; and a radiation source positioned on the drill string.

Method embodiments may include using a monolithic scintillation element comprising a coherent assemblage of joined fibers to generate light scintillations in response to borehole radiation, wherein the fibers are made of an optically transparent scintillation media.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 9A-9C illustrate a detector having a scintillation element comprising a coherent assemblage of fibers having layers;

DETAILED DESCRIPTION

Figure 1:
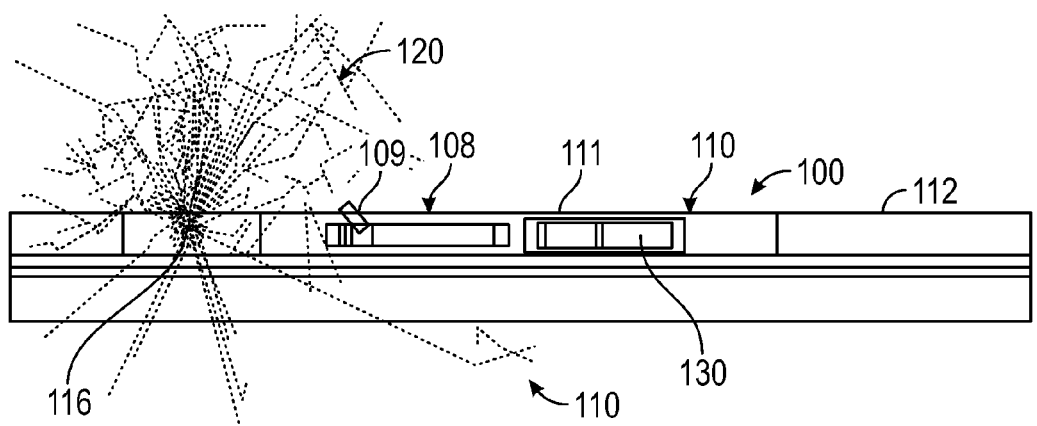
FIG. 1 illustrates a tool for use in a borehole including a gamma ray source and detectors.

In aspects, this disclosure relates to detecting radiation from a subterranean formation. In other aspects, this disclosure relates to estimating a parameter of interest, such as, for example, density, porosity, and so on, of a subterranean formation using detected radiation. In particular, general embodiments detect gamma rays and neutrons. In many instances, the information used for these estimations may be acquired by tools deployed into a wellbore intersecting one or more formations of interest. For context, an exemplary system for deploying and using such tools to acquire this information is described below. Each of these aspects may be referred to generally as investigation of the formation.

The formation may be exposed to energy from a radiation source. Downhole tools may include this radiation source and one or more detectors in one or more detector chambers. Herein, the radiation source may include, but is not limited to, one or more of a neutron source, a gamma-ray source, and an x-ray source. The detectors may be used to detect radiation from the formation, though the detectors are not limited to detecting radiation of the same type as emitted by the radiation source. Detectors may also be used to detect naturally occurring radiation.

Each detector includes a scintillation element including a sensitive volume. The "sensitive volume" is the detection volume, filled with scintillation media. Scintillation media, as defined herein, refers to media in which energy of ionizing radiation is converted to energy of light photons (e.g., scintillation photons). Scintillation media, as used herein, refers to a scintillation material for detecting at least one of gamma rays or neutrons. The sensitive volume does not include accompanying detector materials such as light reflective wrapping, housing, optical light guides, and so on.

Optical light guides ('light guides') have been historically made of quartz or other glass-like transparent material. A light guide is an optically transparent media wherein light produced by the sensitive volume (e.g., the scintillation media) of the detector propagates toward the photodetector. Light guides provide delivery of scintillation photons to a photodetector, and have been implemented as plates, cylinders, or other simple symmetric shapes optically coupled to the scintillation element.

To date, gamma ray-sensitive inorganic scintillation elements have been produced in different forms including polycrystalline and single crystalline blocks. Single crystalline blocks are obtained by various techniques which include melting the phases of row material and keeping melted material in the crucible for a significant time to initiate crystal growth.

As described further below, it may be desirable to use asymmetrical scintillation elements for detecting radiation downhole. One disadvantage of traditional scintillation detectors is that asymmetrical forms of the scintillation element exhibit a non-uniform response from different parts of the element, resulting in non-uniform response of the detector as a whole.

Additionally, some materials which are efficient scintillation media (e.g., media providing large numbers of scintillation photons per unit of absorbed energy of incident radiation) may nonetheless suffer from self-absorption of scintillations. Self-absorption becomes more problematic as the dimensions of the scintillation media increase, because the photons must travel through more material. However, increased dimensions result in greater sensitivity for the detector. Thus, light guides have been employed to provide an optically transparent media, through which scintillations may reach the photodetector. The "active elements" of the detector may be defined as the sensitive volume optically coupled to one or more light guides, directly or indirectly.

For neutron detection, Li-based scintillation glass enriched with an Li-6 isotope is widely used. In well logging devices, Li-based scintillation glass is used in small elements having a length no more than 25 millimeters and outer diameters up to 25 millimeters; or as hollow tubes having thickness of wall 3-4 millimeters, outer diameters of 20-25 millimeters and length of no more than 100 millimeters. The shape of the elements is dictated by self-absorption of the light scintillations in the glass activated with Ce3+ ions. The scintillation band maximum in commercially available GS-20 Li-based glass, such as, for example, that from Saint Gobain, may be peaked near 395 nm. So for light scintillations traveling in such a medium, a significant fraction of light is already absorbed in a few centimeters of the scintillation material. Moreover, when scintillation occurs in the material, light is emitted randomly in different directions, thus increasing effective path length of the light scintillations before it reaches a photo-receiver. On the other hand, the high efficiency of thermal neutron capture by Li-6 enriched glass enables construction of detectors containing a thin layer of the neutron absorbing glass. This design is implemented in detectors having a scintillation element in the form of a hollow tube of height of 75-100 millimeters, outer diameter 20-25 millimeters, and wall thickness of 3-4 millimeters. The part of the hollow cylinder adjacent to the photodetector may be fitted to the outer diameter of a sensitive area of photodetector. Light scintillations created in the walls of the tube may be passed into the air-filled interior of the cylinder, which functions as an air light guide. Use of the air light guide decreases absorption of the light scintillations in the detector. One drawback of this design is a large difference in the refraction indexes of the material of the photo-receiver window and air, which decreases light collection by a factor 2 or more.

FIG. 1 illustrates a tool 100 for use in a borehole 112 including a gamma ray source 116 and detectors 108, 110. For example, the tool may be a gamma density wireline tool. The gamma ray source 116 may be a Cs-137 gamma source emitting 662 KeV gammas into formation. Borehole 112 is depicted as a horizontal borehole, but tool 100 may be configured for a borehole at any inclination or a completely vertical borehole. The volume of interest is directly above the tool.

A configuration of detectors including a Short Spaced ('SS') detector 108 and a Long Spaced ('LS') detector 110 is shown. The detectors may be placed along the borehole at varying distances from the gamma source. Both the gamma source and SS and LS detectors may be surrounded by heavy metal shielding (like lead, tungsten, etc) with collimator windows 109, 111 placed between the formation and SS and LS detectors. Monte Carlo simulated gamma trajectories 120 from a Cs-137 source are shown.

The configuration of FIG. 1 maximizes sensitivity of the detector to the formation. Gamma rays from the formation arrive at the SS and LS detectors through collimator windows, while gamma rays coming from the borehole or tool body are reduced, as many of them are absorbed into the shielding. However, in practice, many gamma rays arrive at the SS and LS detectors from volumes other than the volume of interest (e.g., the borehole), as can be seen from results of a Monte Carlo simulation that allows localization of coordinates of gammas (or other radioactive particles of interest).

Figure 2A:
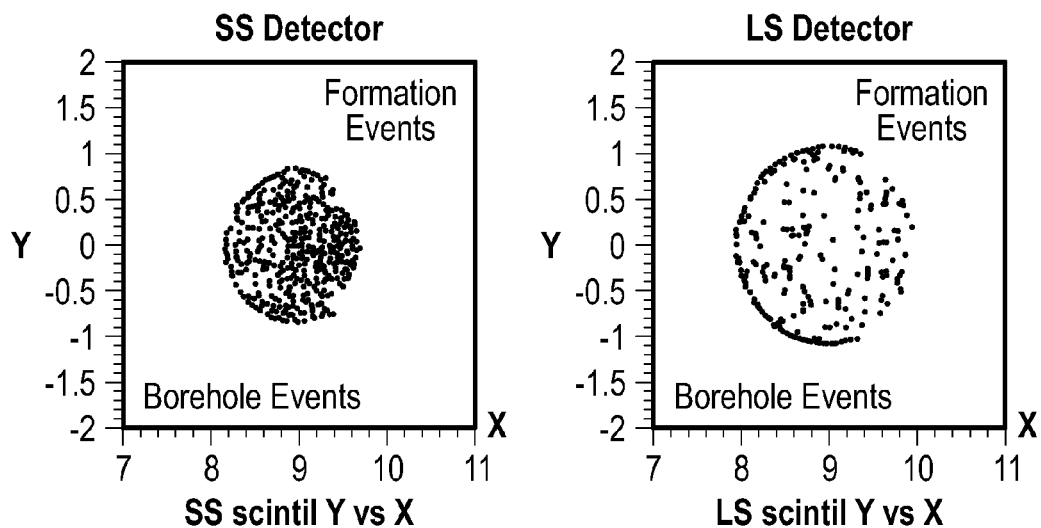
FIGS. 2A and 2B illustrate X and Y coordinates of entry for gamma rays in a plane perpendicular to the longitudinal axis of the borehole ('borehole axis') for the SS and LS scintillator crystal in Monte Carlo simulations.
Figure 2B:
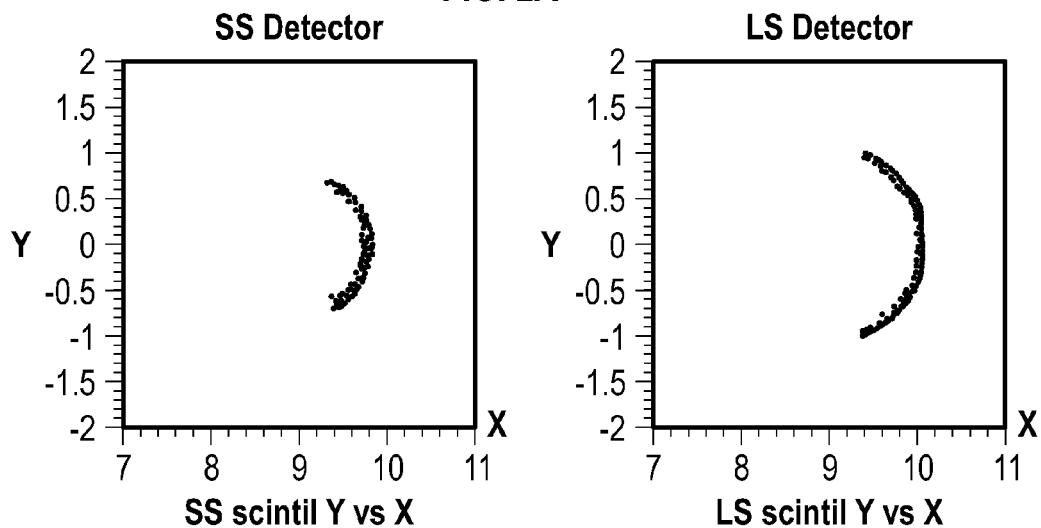

FIGS. 2A and 2B illustrate X and Y coordinates of entry for gamma rays in a plane perpendicular to the longitudinal axis of the borehole (borehole axis') for the SS and LS scintillator crystal in Monte Carlo simulations. The dots of FIG. 2A correspond to gamma rays entering through the collimator windows as well as from other (e.g., borehole) directions. The dots of FIG. 2B correspond to only gamma rays coming from other (e.g., borehole) directions.

The percentage of gamma rays arriving at the scintillation media (e.g., crystals) not from the collimator window depends on the particular tool geometry and borehole diameter. In case of slim tools and large diameter boreholes (for example, greater than 8.5 inches) it can become approximately 25 percent or higher for the LS detector in high density formations. Such large environmental effects will reduce the accuracy of measurements, even when accounted for by Monte Carlo simulations. It is therefore desirable to reduce the number of gamma rays coming from directions other than the collimator windows.

New Scintillation Element

General embodiments of the present disclosure may include detectors having a monolithic scintillation element comprising a coherent assemblage of joined fibers, wherein the fibers are made of an optically transparent scintillation media. The scintillation media is sensitive to at least one of neutrons and gamma ray radiation. "Coherent" as used herein is defined as "united as or forming a whole." Note that this meaning should not be confused with light coherence (pertaining to waves that maintain a fixed phase relationship), which is distinct from the meaning above and not used herein. The coherent assemblage of fibers may be a continuous mass, defined herein as a mass having no voids between fibers. Note that this does not mean the assemblage may not have the shape of a hollow cylinder. The fibers are made of an optically transparent scintillation media, and may be solid, as distinguished from hollow fibers. The assemblage will contain more than 10 fibers, and may contain hundreds or thousands of fibers.

The coherent assemblage of joined fibers may be heat-joined. Fibers may be created at the drain and extrusion of the melt from a crucible filled with glass melt. Baking of the fibers allows construction of different shapes of monolithic blocks with minimal loss of light scintillations. A stainless steel form of a corresponding shape may be loaded with fibers, for example, with a diameter 0.1-5 millimeters and length 10-1000 millimeters. Asymmetric scintillation elements can be produced from the glass of a composition of di-silicate of Barium DSB:Ce (BaSi2O5:Ce3+) fibers by baking of fibers in a metal form under pressure in vacuum at temperature higher than the vitrification temperature of the material (Tg) but lower than the temperature of avalanche crystallization. This temperature may be within a range of 800-875 degrees Celsius. The form may be placed in a vacuum chamber heated slightly above Tg. Simultaneously, the form may be subjected to pressure until outer surfaces of the fibers are baked to one another. During this process, the round shape of the fibers may be deformed, such that the cross-section is transformed from round to hexagonal. However, the fibers remain substantially unmixed, and retain their individual nature as distinct fibers. Thus, other embodiments may include a coherent assemblage of fibers joined using an optical adhesive such as optical resins or glues.

Production of crystalline fibers of various scintillation materials having parameters similar to crystals obtained by the Czochralski method or other pulling techniques is now possible. Moreover, scintillation materials in a form of fibers can be obtained from newly developed nanostructured gamma sensitive glass and glass ceramics, such as, for example, di-silicate of Barium DSB:Ce (BaSi2O5:Ce3+). Similar to LuAG:Ce scintillation material, DSB:Ce is also a media with high effective charge (Zeff). Both materials are suitable for detecting gamma-quanta over a wide range of energies. Yttrium aluminum garnet doped with Ce is also a high light-yield scintillator; it can be produced in a fiber form but its effective charge is substantially smaller than for LuAG:Ce or DSB:Ce. LuAG:Ce scintillation material has disadvantages in use for well logging namely its self-radioactivity.

Further, while use of traditional single crystal inorganic scintillators like CsI(Na), NaI(Tl), BGO or GSO is limited to strictly cylindrical forms for high temperature downhole applications due to their anisotropic coefficient of thermal expansion, joined fiber materials made up of fibers comprising crystalline scintillation materials (e.g., LuAG and YAG), amorphous glass, nanostructured glass ceramics and the like can be applied in various different asymmetric shapes.

Each fiber in the coherent assemblage delivers light from scintillation to a photodetector (e.g., a photomultiplier tube) with the same efficiency, which depends only on attenuation of the light in the fiber. Attenuation of the light in the scintillation materials depends on the overlapping of the crystal absorption and luminescence spectra. This overlapping is characterized by a Stokes shift of the luminescence spectrum. Ce-doped crystalline scintillators demonstrate acceptable light yield decrease with the temperature, but demonstrate small Stokes shift (usually less than 0.25 eV). Thus, a majority of Ce doped scintillation materials are well-suited as scintillators when the detectors made therefrom have small thicknesses (a few centimeters at most). Among a variety of crystalline Ce doped materials, YAG:Ce has a significant Stokes shift; the length of the detector made from YAG:Ce may be more than 10 centimeters.

DSB:Ce glass ceramic scintillation material has a Stokes shift equal to 0.38 eV which is 50 percent larger than a typical shift of Ce3+ luminescence in oxide materials, and thus it is highly transparent to its own scintillations (having a maximum at 455 nanometers). As a result, even long fibers (e.g., up to 1 meter long) can provide minimal light losses due to self-absorption of light scintillations.

Figure 3:
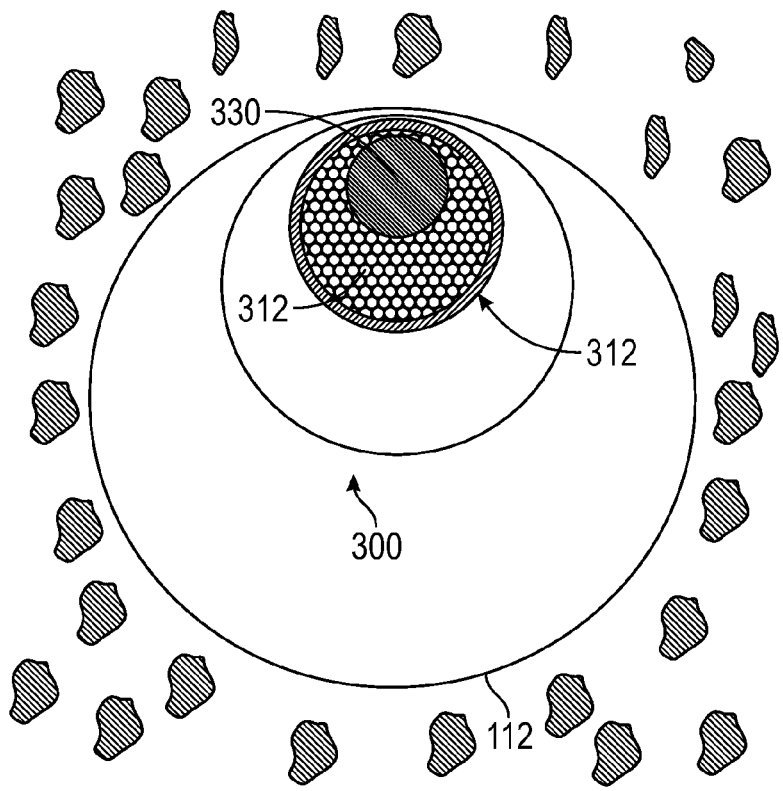
FIG. 3 illustrates a detector in accordance with embodiments of the present disclosure for use in tool in a borehole.

FIG. 3 illustrates a detector 300 in accordance with embodiments of the present disclosure for use in tool 100 in a borehole 112. Detector 300 includes monolithic scintillation element 312 comprising a coherent assemblage of joined fibers 320. The (joined) fibers are made up of scintillation media sensitive to gamma rays, and so the detector is adapted to detect gamma rays. The coherent assemblage of fibers surrounds a further (non-fiber) scintillation media 330 having different scintillation characteristics than the scintillation media of the fibers. For example, scintillation media 330 may be a traditional single crystalline or polycrystalline cylindrical scintillator NaI(Tl), CsI(Tl), CsI(Na), BGO, GSO, LuAG:Pr or any other cylindrical scintillator as would occur to one of skill in the art. The coherent assemblage of joined fibers 320 may thus be constructed in a variety of shapes, including asymmetric shapes.

Detector 300 may include at least one photodetector 130 configured to produce a first output in response to first light scintillations generated by the coherent assemblage of fibers and a second output in response to second light scintillations generated by the further scintillation media. A processor configured to determine a difference in the amount of the first light scintillations and the second light scintillations from the first output and the second output may be operatively coupled to the photodetector.

Using Monte Carlo simulation, dimensions of both scintillators and collimator windows can be simulated such that: the probability of having a signal from crossing gamma rays in element 312 will be maximized (here, Compton scattering events may be sufficient for a signal); and counts from the cylindrical scintillator (placed near a collimator window) will be sufficient for statistical significance. The further scintillation media may be selected to be an efficient scintillator (e.g., CsI, BGO, GSO, and so on) to reduce gamma re-scattering into the fiber. Events which will produce a signal in the crystal scintillator but do not produce signals in the fiber based scintillator can be used for formation characterization. Such techniques may be used with LS detectors and low porosity, high density formations, due to the significant non-formation gamma component. This technique may not significantly reduce the LS counts, as the initial 662 keV energy of gammas will be significantly reduced by Compton scattering in the media and a major part of already soft gammas can be absorbed in the heavy crystal scintillator positioned in front of the collimator window.

Thus, the scintillation element may be azimuthally sensitive, and the scintillation detector may be configured to detect gamma rays such that, during nominal operation, the probability of detection of gamma rays in the scintillation media is maximized subject to detection of a threshold number of gamma rays in the further scintillation media.

Figure 4:
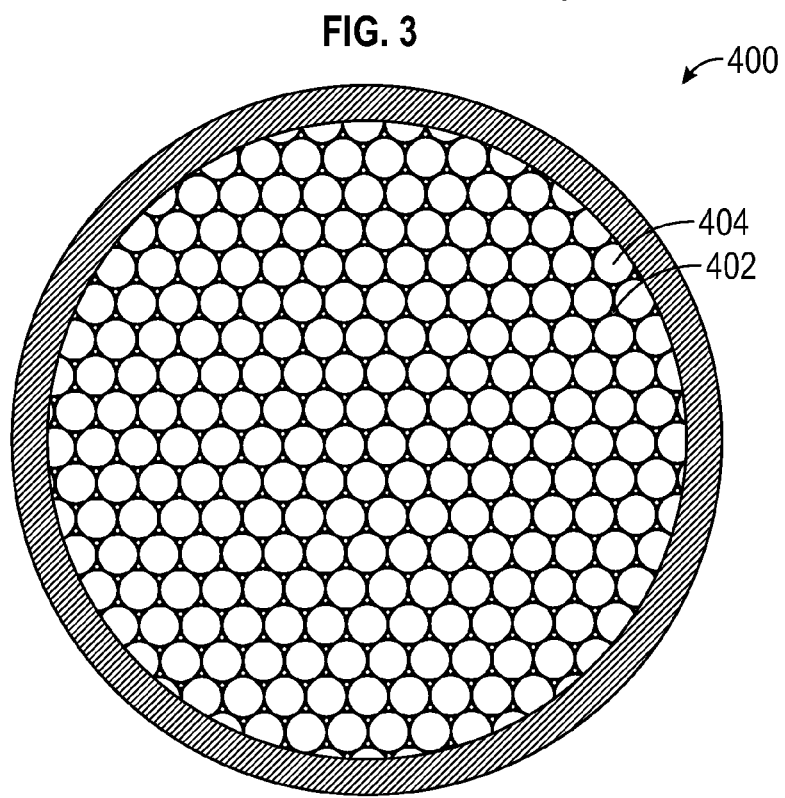
FIG. 4 illustrates another detector in accordance with embodiments of the present disclosure for use in tool in a borehole.

FIG. 4 illustrates another detector 400 in accordance with embodiments of the present disclosure. Fiber-based heat-joined scintillators may also be made using DSB:Ce or YAG:Ce fiber crystals. Rods 402 of heavy metal (e.g., tungsten (W)), may be placed between fibers 404. These rods 402 may increase efficiency of the gamma-quanta absorption. Thickness of rods may be related to the possibility of effective escape of hot electrons and characteristic X-rays from rods to excite scintillations in fibers. In one example, thickness is less than 100 μm.

In other embodiments, the scintillation media of the joined fibers may be sensitive to neutrons, and the detector is adapted to detect neutrons. Optical fibers sensitive to neutrons may be juxtaposed with non-scintillating optically transparent fibers in the assemblage.

Commercially available GS-20 as well as Li-6 based scintillation nano-glass ceramics can be produced in the form of optical fibers. Scintillation properties of the fibers and their sensitivity to neutrons are controlled by the presence of Li-6 isotope and a doping ion (e.g., Ce3+) in the material. Glass or glass ceramics made from the raw material enriched with 7-Li isotope are not sensitive to thermal neutrons. That is, they will not scintillate and not absorb thermal neutrons. Glass or glass ceramics made from the raw material enriched with 7-Li ions but without doping with Ce ions are not sensitive to thermal neutrons or other radiation, and will be transparent to the light scintillations of Ce-doped glass or glass ceramics.

Figure 5A:
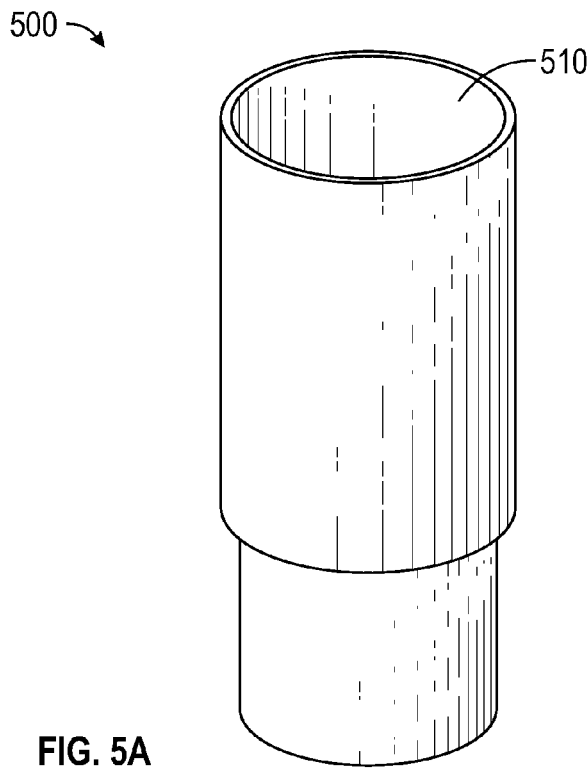
FIGS. 5A & 5B illustrate a neutron detector in accordance with embodiments of the present disclosure.
Figure 5B:
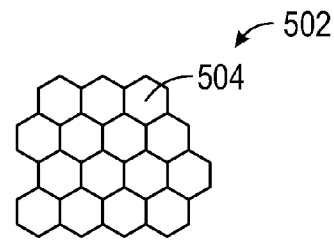

FIGS. 5A & 5B illustrate a neutron detector in accordance with embodiments of the present disclosure. The detector 500 includes a scintillation element 510 comprising a coherent assemblage 502 of fibers 504 sensitive to neutrons. Fibers 504 may be surrounded by cladding 506 made of soft glass or the like, which may be non-scintillating and optically transparent, and act as optical light guides. The fibers may be heat-joined. Each fiber may be surrounded by cladding. The detector may be a cylinder with diameter from 0.01 inch to 5 millimeters and height of 20-100 millimeters. A tool may include detector 500 along with a source of fast neutrons, such as, for example, a Pulsed Neutron Generator ('PNG') or radioisotope source (e.g., Am—Be chemical neutron source).

Figure 5C:
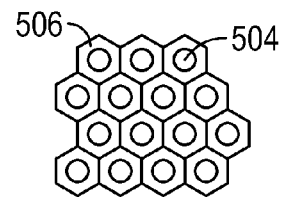
FIG. 5C illustrates embodiments wherein each fiber is surrounded by cladding.

In operation, light scintillations propagate substantially only along the fibers. This is exactly true for photons emitted at angles satisfying condition of Total Internal Reflection, and photons not satisfying the condition will enter adjacent fibers where, with high probability, they will fall under the TIR condition. Some scintillation photons may reach external light reflection wrapping and come back into fibers at different angles; some of these angles again will fall under the TIR condition. Thus, the coherent assemblage of fibers is configured to allow light to travel substantially parallel to the longitudinal axis of the fibers. In total, these conditions increase light collection and improve detector energy resolution. The fibers may be at least 50 centimeters or more in length. In some implementations, at least a portion of the fibers may each be surrounded by cladding. FIG. 5C illustrates embodiments wherein each fiber is surrounded by cladding.

Figure 6:
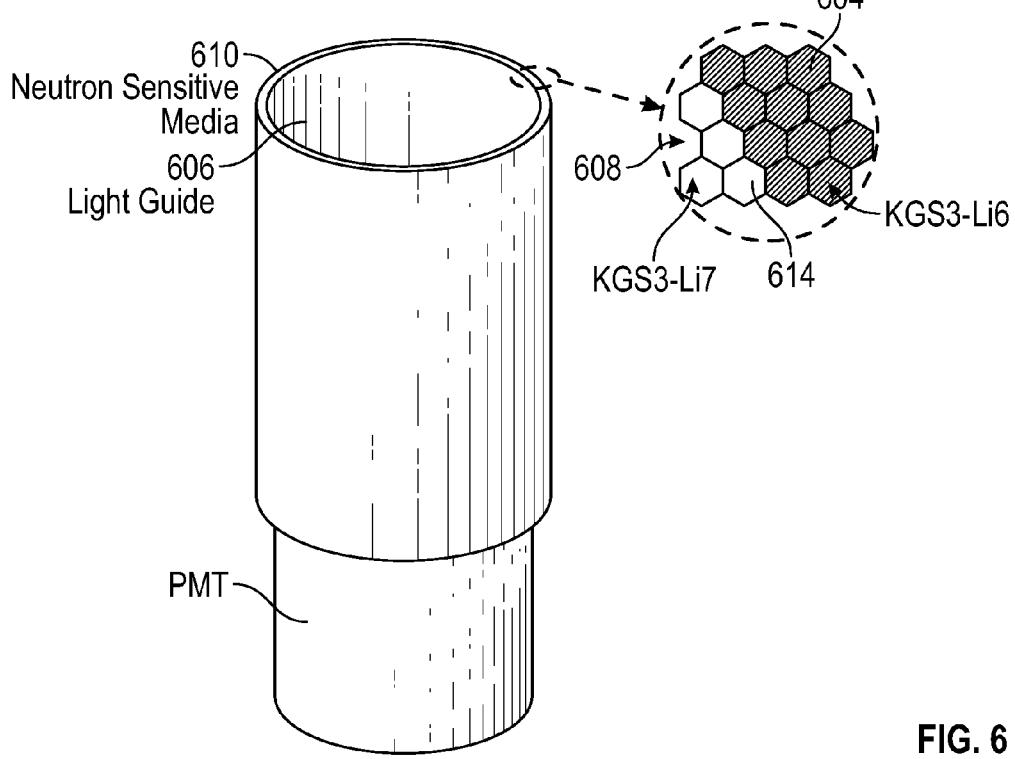
FIG. 6 illustrates another neutron detector in accordance with embodiments of the present disclosure.

Constructing scintillator elements in accordance with aspects of the present disclosure enables several new detector designs. FIG. 6 illustrates another neutron detector in accordance with embodiments of the present disclosure. The coherent assemblage of fibers may include a first layer of fibers forming a first radiation responsive component and a second layer of fibers forming an optically transparent light guide. The detector 600 includes a scintillation element 610 comprising a coherent assemblage 602 of fibers 604 sensitive to neutrons which surrounds an optical light guide 606 comprising a second coherent assemblage 608 of fibers 614 which are non-scintillating and optically transparent. The fibers may be uncladded and approximately 1 millimeter in diameter. The fibers may be heat-joined. The first coherent assemblage 602 forming the scintillation element 610 may be formed of approximately three to five rings of fibers surrounding the second coherent assemblage 608. The first assemblage may be made up of scintillation cerium-doped glass or glass ceramics containing Li-6, while the second assemblage may be made up of undoped glass or glass ceramics fibers containing Li7, which are not sensitive to neutrons. Light transmission is optimized across the glass-lightguide-photodetector path, because the refractive index will be substantially similar (e.g., n=1.57). This may be particularly desirable at elevated temperatures consistent with downhole environments. In considering the structure of the material, substantially similar refers to at least the first and second coordinate spheres being the same; for example, there may be some difference in the third or fourth order. This may be due to a difference in atomic mass of Li-6 and Li-7. The first coordinate sphere is the sphere of nearest atoms to the considered ion, the second is the next shell of atoms, and so on.

Variations of the above designs may be employed. For example, all fibers may be surrounded with cladding, which may increase light yield (LY) and energy resolution of the detector. In this configuration, the significance of inner Li7 fibers as a light guide is reduced. In some implementations, a natural mixture of 7Li/6Li isotopes may be enriched with Li6. The particular extent of enrichment may be configured for a particular portion of the coherent assemblage to provide sensitivity to particular radiation, such as, for example, thermal neutrons (e.g., outer layer of Li6 enriched fibers), epithermal neutrons (inner layer of fibers enriched with 6-Li up to desired value), and so on. Light from all fibers can be collected on a single photodetector detecting scintillations of both thermal and epithermal neutrons. Alternatively, scintillations may be detected on two photodetectors placed on opposite ends of an active volume (e.g., a scintillation cylinder). For example, outer layers may be optically coupled to one PMT (e.g., that detects thermal neutrons) and inner fibers on another PMT (e.g., that detects epithermal neutrons). Estimation of the parameters of interest may be carried out using differences in the signals attributed to each scintillation element.

Figure 7:
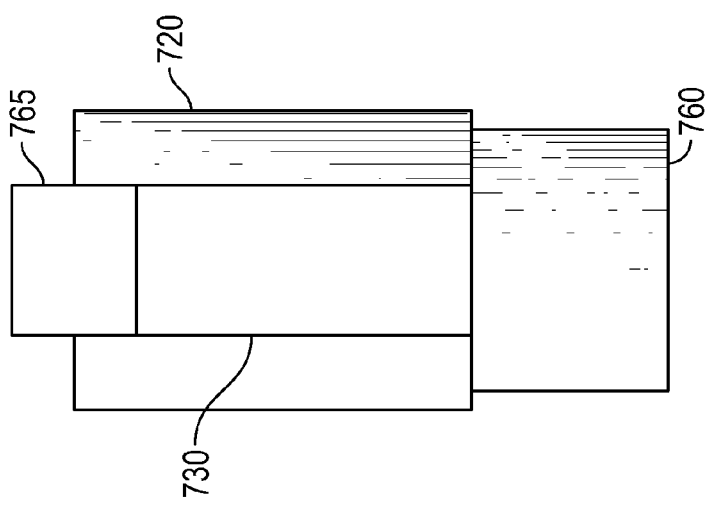
FIG. 7 illustrates a detector having scintillator elements in accordance with embodiments of the present disclosure.

FIG. 7 illustrates a detector 700 having scintillator elements in accordance with embodiments of the present disclosure. The scintillator elements include a first layer 720 of fibers and a second layer 730 of fibers. The detector 700 further includes a first photodetector 160 (e.g., photomultiplier tube) optically coupled to the first fiber layer 720 at one end, and a second light responsive device 765 (e.g., photomultiplier tube) optically coupled to the second fiber layer 130 at another end, such that light scintillations occurring in the elements are converted to electrical signals. The second layer 730 is disposed within the first layer 720, and thus placed within the space surrounded by the outer layer 720. The first layer 720 comprises a cylinder with an inner well. In other embodiments, first layer 720 may be implemented as a hollow cylinder circumscribing the second radiation responsive element.

Particular detector embodiments may collect light scintillations from outer fibers on a first side of the detector (e.g. the side adjacent the formation) on a first photodetector and light scintillations from outer fibers on a second side (e.g. the side adjacent to the mud channel in LWD systems) on a second photodetector. Such a configuration will create azimuthal sensitivity to thermal neutrons. Signals from the first side (e.g., "looking at" the formation) increase system sensitivity, while counts from other side (e.g., "looking on" the mud channel) may be used to monitor environmental factors. Interior fibers in such construction can be made, for example, from a transparent neutron absorptive material, such as glass with Boron contamination, to eliminate cross talk between fibers on opposite sides of the detector.

Boron has some advantages in absorbing thermal and epithermal neutrons, as the neutron absorption cross section is high. Boron-silicate glasses have properties similar to quartz. Boron-silicate glasses lack temperature sensitivity and are not prone to breakdown. Further, light transmission characteristics of these glasses remain substantially constant throughout the range of temperatures typically found in the borehole.

Alternatively, the inner part of detector could also be made from gamma sensitive fibers or from a single-crystal gamma sensitive scintillator. Detecting two sets of corresponding scintillations may be carried out on one PMT, followed by using an neutron-gamma separation technique based on analysis of electrical signals shape (phosphich detector). Alternatively, scintillations may be collected on two PMTs, each at different side of the detector, providing simultaneous gamma and neutron detection without need of additional electronics for neutron-gamma separation. Thus, the scintillation element may have azimuthal sensitivity, allowing differentiation of the direction from which radiation approaches the element.

Figure 8:
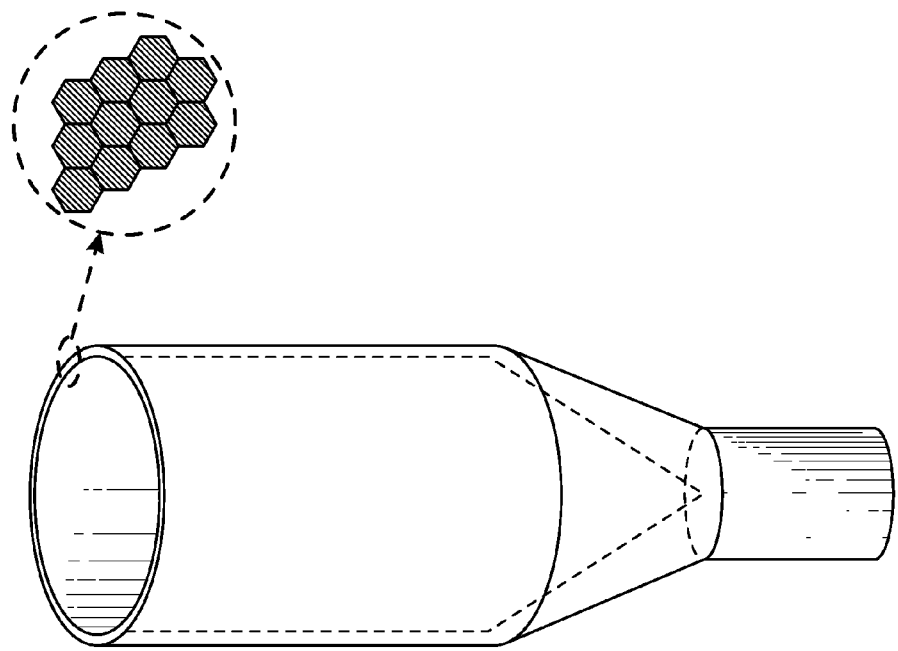
FIG. 8 illustrates a detector where the inner cylinder diameter is tapered off near the PMT to create a frustoconical shape.

An additional convenience is that the diameter of the tube may be decreased to the value corresponding to diameter of PMT photocathode simply by drawing out one end of the tube at a temperature slightly above Tg. Simultaneously, the inner cylinder diameter may be tapered off near the PMT to create frustoconical shapes. See FIG. 8. Such construction (for fibers with or without cladding) will have an advantage compared to the traditional hollow cylinder because it will minimize a difference between refractive index of PMT window and light guide. Shapes of the scintillating blocks are not necessary limited to cylindrical shapes, providing a significant advantage to possible configurations for scintillators in downhole nuclear tools.

Fast neutrons may be thermalized by the formation. In particular embodiments, a tool may include a detector with scintillation elements having sensitivity to thermal neutrons in the shape of ring segments.

FIGS. 9A-9C illustrate a detector 900 having a scintillation element 910 comprising a coherent assemblage of fibers 904 including a first layer of fibers 906 sensitive to neutrons forming a first radiation responsive component 916, which surrounds a second layer of fibers 902 forming an optical light guide 912. The second layer of fibers may be non-scintillating and optically transparent. The coherent assemblage of fibers may include a third layer of fibers 908, interior to the first layer 906 and second layer 902, and forming a second radiation responsive component 918. The first radiation responsive component 916 may be configured to detect neutrons from the earth formation; and the second radiation responsive component 918 may be configured to detect neutrons from the borehole. The second layer of fibers 902 may be made of an optically transparent neutron absorptive material.

For example, an outer layer (approximately 3-5 millimeters thick) in such elements could be made of fibers with Li-6 enriched material and light collected on PMT placed on a first side of scintillating element 910. The next layer could be made of fibers with Boron containing glass, as described above. The inner layer, also with thickness of 3-5 millimeters could, be made from fibers with Li-6 enriched glass, and with light collection done on a separate PMT placed on another side of the scintillating element.

Such scintillating elements can be placed in the grove at the exterior surface of a tool (e.g., an LWD tool) and then covered with protective pipe. A plurality (e.g., 2 to 4) of such elements 910' may be circumferentially arrayed about the tool at the exterior surface. In some implementations, thermal neutron sensitive elements may form a continuous belt approximately at the surface of the tool. Thermal neutron sensitive scintillating elements with such construction may be sensitive to thermal neutrons coming from the formation (outer layers) and, independently, to thermal neutrons coming from inner parts of the tool body (inner layers), e.g., predominantly from the mud channel 930. Intermediate layers enriched with chemical elements with large absorption cross section for thermal neutrons (for example, boron, gadolinium, etc.) will strongly reduce cross talk between sensitive layers. In one implementation, thermal neutron sensitive elements can be placed in a plurality of "belts" corresponding to traditional Short Spaced and Long Spaced detectors. Thus, using information from the plurality of belts, neutron porosity may be determined using traditional methods, e.g., by calculating a ratio between counts from SS and LS scintillating elements.

Embodiments in accordance with aspects of the present disclosure may provide azimuthal sensitivity to neutron porosity during drilling operations. Rotation of the LWD tool will expose different parts of the formation to different scintillating elements periodically. Using time synchronization with the LWD rotation speed, it is possible to combine porosity data (and/or other data which can be derived from thermal neutron measurements) for desired number of azimuth sectors in the formation.

As compared with existing tools, these embodiments may display enhanced sensitivity to the formation with reduced effects due to environmental factors. Thermal neutron detectors may have a significantly larger surface area. This increase surface area may provide significantly higher statistical accuracy of porosity measurements. The increased accuracy, in combination with azimuthal sensitivity, may enable geosteering in dependence upon detector information. Similar wireline tools would also have improved sensitivity to formation, reduced environmental effects, and higher statistical accuracy (which may allow higher logging speeds).

Figure 10:
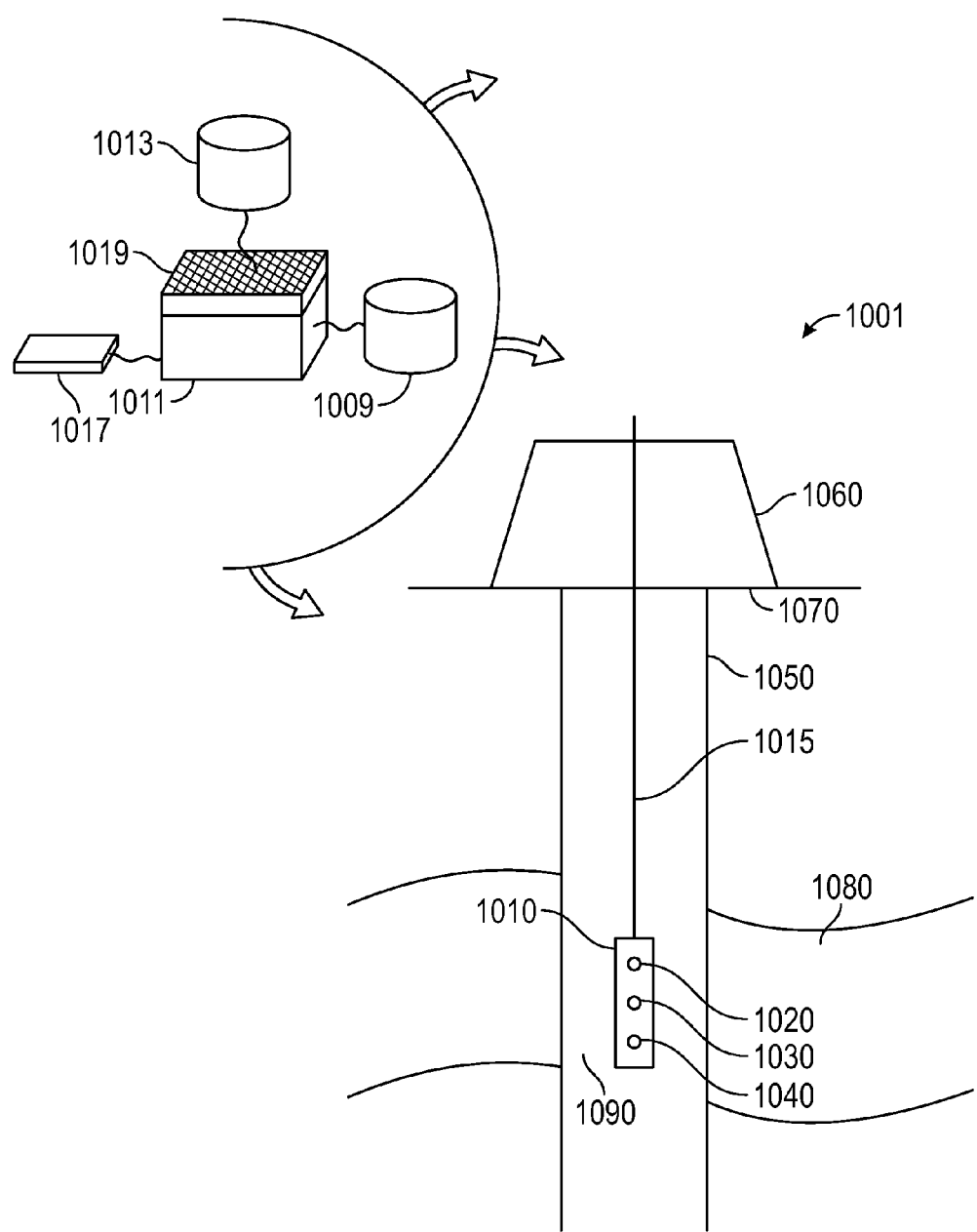
FIG. 10 schematically illustrates a system having a downhole tool configured to acquire information for estimating a parameter of interest of a formation.

As discussed above, radiation detectors disclosed herein may be used in conjunction with wireline, MWD, LWD, and other downhole tools. An example system is illustrated herein. FIG. 10 schematically illustrates a system 1001 having a downhole tool 1010 configured to acquire information for estimating a parameter of interest of a formation 1080. In one illustrative embodiment, the tool 1010 may contain a radiation source 1020 and detectors 1030, 1040. Parameters of interest may include information relating to a geological parameter, a geophysical parameter, a petrophysical parameter, and/or a lithological parameter.

The system 1001 may include a conventional derrick 1060 erected on a derrick floor 1070, or may be vehicle based. A conveyance device (carrier 1015) which may be rigid or non-rigid, may be configured to convey the downhole tool 1010 into wellbore 1050 in proximity to formation 1080. The carrier 1015 may be a drill string, coiled tubing, a slickline, an e-line, a wireline, etc. Downhole tool 1010 may be coupled or combined with additional tools (e.g., some or all the information processing system of FIG. 10). Thus, depending on the configuration, the tool 1010 may be used during drilling and/or after the wellbore 1050 has been formed. While a land system is shown, the teachings of the present disclosure may also be utilized in offshore or subsea applications. The carrier 1015 may include embedded conductors for power and/or data for providing signal and/or power communication between the surface and downhole equipment. The carrier 1015 may include a bottom hole assembly, which may include a drilling motor for rotating a drill bit.

The radiation source 1020 emits radiation (e.g., neutrons) into the formation to be surveyed. In one embodiment, the downhole tool 1010 may use a pulsed neutron generator emitting 14.2 MeV fast neutrons as its radiation source 1020. The use of 14.2 MeV neutrons from a pulsed neutron source is illustrative and exemplary only, as different energy levels of neutrons may be used. In some embodiments, the radiation source 1020 may be continuous. In some embodiments, the radiation source 1020 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

The detectors 1030, 1040 provide signals that may be used to estimate the radiation counts (e.g., neutron counts or gamma ray counts) returning from the formation. Generally, detectors 1030, 1040 may be spaced in a substantially linear fashion relative to the radiation source. If two detectors are used, there may be a short spaced (SS) detector and a long spaced (LS) detector, wherein the detectors have different distances from the radiation source. For instance, in one embodiment, detectors 1030 may be a short spaced detector, and detectors 1040 may be a long spaced detector. The SS and LS detectors are not limited to being placed on the same side of the radiation source and their spacing from the radiation source may be equal or unequal. Additional detectors may be used to provide additional radiation information. Two or more of the detectors may be neutron detectors, neutron detectors, or some combination. Drilling fluid 1090 may be present between the formation 1080 and the downhole tool 1010, such that emissions from radiation source 1020 may pass through drilling fluid 1090 to reach formation 1080 and radiation induced in the formation 1080 may pass through drilling fluid 1090 to reach the detectors 1030, 1040.

In one embodiment, electronics (not shown) associated with the detectors may be configured to record radiation counts from at least two axially spaced detectors 1030, 1040 and generate a time-dependent ratio between axially spaced detectors by using information from multiple bursts. This detection may occur within very narrow time bins or windows (on the order of 1 to 1000 microseconds) so as to be substantially continuous. This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. In some embodiments, the time-dependent ratio may be weighted. The axially spaced detector count rate ratios may be obtained as a function of time and graphically illustrated as a time-dependent ratio curve. Various properties of the formation may be determined using the time-dependent ratio curve, including, but not limited to, porosities of the formation.

In other embodiments, such electronics may be located elsewhere (e.g., at the surface). To perform the treatments during a single trip, the tool may use a "high bandwidth" transmission to transmit the information acquired by detectors 1030, 1040 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

One or more of the detectors 1030, 1040 may include a scintillation element in accordance with the present disclosure and at least one photodetector (e.g., a photomultiplier tube, charge coupled silicon device, or other photomultiplier device or light responsive device, or the like) configured to produce an output representative of the respective light scintillations.

Figure 11:
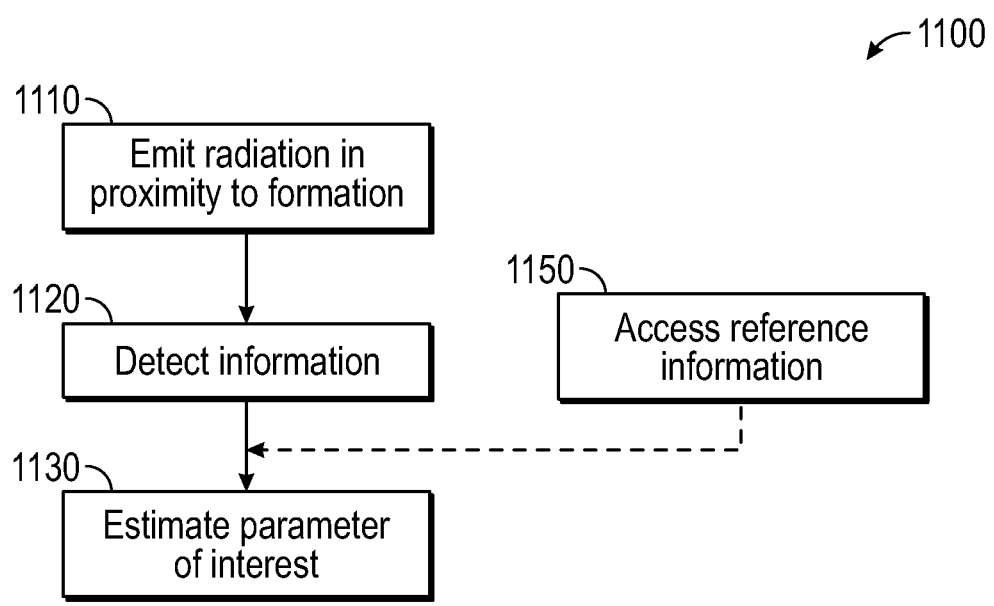
FIG. 11 shows, in flow chart form, methods according to the present disclosure for estimating at least one parameter of interest of the formation.

FIG. 11 shows, in flow chart form, one method 1100 according to the present disclosure for estimating at least one parameter of interest of the formation 1080 (FIG. 10) using a model relating radiation count information acquired from at least one detector 1030, 1040 to the parameter of interest. Referring now to FIGS. 10 and 11, method 1100 may include step 1110, where the radiation source 1020 emits ionizing radiation in proximity to the formation 1080. In step 1120, information related to interactions of radiation with the formation 1080 may be collected by one or more of detectors 1030, 1040. In step 1130, a parameter of interest (e.g., density, porosity, etc.) of the formation 1080 may be estimated by applying one or more count rates from one or both of the detectors to the model. Information collected by the detector(s) may be used to generate a difference between or a ratio of the neutron counts attributable to the detectors. The estimation of the parameter of interest may also include comparison or combination of the neutron count information with reference information about the formation. In some embodiments, estimation methods 1100 may include step 1150, where reference information on the formation or formations generally is accessed. Reference information may be combined with neutron count information in step 1130 to estimate the parameter of interest.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

Since transmission of a media is wavelength dependent, for a scintillation material itself and for corresponding materials such as light guides, high transmission is mostly important in the wavelength region of scintillations to guarantee that as many scintillation photons as possible will reach a photodetector. Therefore, attenuation coefficient k of a scintillation material is often provided for the wavelength of maximum of scintillation emission spectrum.

As used herein, an optically transparent media may be a media with high optical transmission, or with low attenuation. In scintillation techniques, optical transparency of scintillators and corresponding optical materials may vary significantly. As used herein, nominal operation refers to a range of environmental factors characteristic of those predicted for a particular environment.

Commensurately, "optically transparent" media in the context of the present disclosure means media with loss of scintillation photons of no more than ten percent. For optical glass, typical transmittance at 420-430 nm (scintillation emission maximum of scintillation glass ceramics) may be as large as 97 percent for 10 cm light pass. As used herein, monolithic refers to being formed into a single larger indivisible body. A nanostructured glass ceramic is an amorphous glass body containing inclusions of crystallite phase (ordered phase) with nano size (size less than 1 micron).

As used herein, "optically coupled" may be defined as joined in a way providing beneficial conditions for light propagating in a first media to enter a second media. For example, if the joined media have refractive indexes n1 and n2 respectively, and n1>n2, beneficial conditions exist when the gap is filled with optical grease, adhesive, or the like with refractive index n3 such that n1>n3>n2.

"Radiation responsive" is defined as the characteristic of being sensitive to radiation so as to produce a detectable emission in response to absorbing radiation such that the absorbed radiation is quantifiable according to the emissions. Thus, further, "gamma responsive" is defined as the characteristic of producing a detectable emission in response to absorbing gamma rays such that the absorbed gamma rays are quantifiable according to the emissions; and "neutron responsive" is defined as the characteristic of producing a detectable emission in response to absorbing neutrons such that the absorbed neutrons are quantifiable according to the emissions. A fiber is defined here to mean a semiflexible member having a diameter of less than 5 millimeters, and/or a ratio of maximum length to maximum width of cross section of greater than 100.

With regard to scintillations propagating substantially only along the fibers, by "substantially all," it is meant a portion of scintillations sufficiently high to allow use of only those scintillations propagating along the fibers (and derivations and comparisons thereof, such as differences, ratios, rates of change, and so on) to determine a parameter of interest of the formation, examples of such a portion including, for example, at least 90 percent, at least 95 percent, at least 99 percent, at least 99.9 percent, and so on, up to an including all scintillations.

As used above, the term "absorb" refers to absorption in the sense of converting ionizing radiation to other detectable indicia, such as, for example, photons. As used above, the term "incident" or "incident on" refers to impinging on the physical space of or penetrating the defining boundaries of (e.g., entering a media). Photodetector, as used herein, means any light responsive device, such as a photomultiplier, that is able to detect and quantify light scintillations for the purposes described herein. "Light yield" may be defined as the number of scintillation photons emitted per 1 absorbed unit of radiation. For example, the number of scintillation photons emitted per 1 absorbed neutron for neutron detectors, or the number of scintillation photons emitted per 1 unit of absorbed gamma ray energy (per 1 MeV, typically) for gamma detectors.

Referring again to FIG. 10, certain embodiments of the present disclosure may be implemented with a hardware environment that includes an information processor 1011, an information storage medium 1013, an input device 1017, processor memory 1019, and may include peripheral information storage medium 1009. The hardware environment may be in the well, at the rig, or at a remote location. Moreover, the several components of the hardware environment may be distributed among those locations. The input device 1017 may be any data reader or user input device, such as data card reader, keyboard, USB port, etc. The information storage medium 1013 stores information provided by the detectors. Information storage medium 1013 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 1013 stores a program that when executed causes information processor 1011 to execute the disclosed method. Information storage medium 1013 may also store the formation information provided by the user, or the formation information may be stored in a peripheral information storage medium 1009, which may be any standard computer information storage device, such as a USB drive, memory stick, hard disk, removable RAM, or other commonly used memory storage system known to one of ordinary skill in the art including Internet based storage. Information processor 1011 may be any form of computer or mathematical processing hardware, including Internet based hardware. When the program is loaded from information storage medium 1013 into processor memory 1019 (e.g. computer RAM), the program, when executed, causes information processor 1011 to retrieve detector information from either information storage medium 1013 or peripheral information storage medium 1009 and process the information to estimate a parameter of interest. Information processor 1011 may be located on the surface or downhole.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A formation evaluation tool for detecting radiation in a borehole in a volume of an earth formation, comprising:
    a detector including a monolithic scintillation element comprising a coherent assemblage of heat-joined fibers, wherein the fibers are made of an optically transparent scintillation media,
    wherein the scintillation media comprises at least one of i) organic crystalline scintillation materials, ii) amorphous glass, and iii) nanostructured glass ceramics.

2. The tool of claim 1 wherein the fibers are at least one of i) gamma ray responsive; and ii) neutron responsive.

3. The tool of claim 1 wherein the coherent assemblage of fibers is a continuous mass.

4. The tool of claim 1 wherein the fibers are solid.

5. The tool of claim 1 wherein the coherent assemblage of fibers surrounds a further scintillation media having different scintillation characteristics than the scintillation media.

6. The tool of claim 1 wherein the assemblage of fibers further includes a plurality of heavy metal rods interspersed with and substantially parallel to the fibers.

7. The tool of claim 1 wherein the scintillation element surrounds an optical light guide comprising a second coherent assemblage of heat-fused fibers.

8. The tool of claim 1 wherein the fibers are at least 50 centimeters in length.

9. The tool of claim 1 wherein the coherent assemblage of fibers is configured to allow light to travel substantially parallel to the longitudinal axis of the fibers.

10. The tool of claim 1 wherein at least a portion of the fibers are each surrounded by cladding.

11. The tool of claim 1 wherein the coherent assemblage of fibers comprises a first layer of fibers forming a first radiation responsive component and a second layer of fibers forming an optically transparent light guide.

12. The tool of claim 11 wherein the coherent assemblage of fibers comprises a third layer of fibers, interior to the first layer and second layer, forming a second radiation responsive component; and wherein
    the first radiation responsive component is configured to detect neutrons from the earth formation;
    the second layer of fibers is made of an optically transparent neutron absorptive material; and
    the second radiation responsive component is configured to detect neutrons from the borehole.

13. The tool of claim 1 further comprising:
    a drill string; and
    a radiation source positioned on the drill string.

14. A method for detecting radiation in a borehole in a volume of an earth formation, comprising:
    using a monolithic scintillation element comprising a coherent assemblage of heat-joined fibers to generate light scintillations in response to borehole radiation, wherein the fibers are made of an optically transparent scintillation media,
    wherein the scintillation media comprises at least one of i) organic crystalline scintillation materials, ii) amorphous glass, and iii) nanostructured glass ceramics.

15. A formation evaluation tool for detecting radiation in a borehole in a volume of an earth formation, comprising:
    a detector including a monolithic scintillation element comprising a coherent assemblage of heat-joined fibers, wherein the fibers are made of an optically transparent scintillation media, wherein the coherent assemblage of fibers is asymmetric.

16. The tool of claim 15 wherein the coherent assemblage of fibers surrounds a further scintillation media having different scintillation characteristics than the scintillation media;
    at least one photodetector configured to produce a first output in response to first light scintillations generated by the coherent assemblage of fibers and a second output in response to second light scintillations generated by the further scintillation media; and
    a processor configured to determine a difference in the amount of the first light scintillations and the second light scintillations from the first output and the second output.

17. The tool of claim 16 wherein the scintillation element is azimuthally sensitive.

18. The tool of claim 16 wherein the further scintillation media comprises at least one of i) single crystal material and ii) polycrystalline material.

19. The tool of claim 16 wherein the scintillation detector is configured to detect gamma rays such that, during nominal operation, the probability of detection of gamma rays in the scintillation media is maximized subject to detection of a threshold number of gamma rays in the further scintillation media.

* * * * *